June 8, 1965 H. A. HADLEY 3,188,151
WEIGHING SCALE BEARING STRUCTURE
Original Filed Oct. 13, 1959

INVENTOR
HARLAN A. HADLEY
BY Sherman & Sherman
ATTORNEYS

United States Patent Office 3,188,151
Patented June 8, 1965

3,188,151
WEIGHING SCALE BEARING STRUCTURE
Harlan A. Hadley, P.O. Box 137, Burlington, Vt.
Original application Oct. 13, 1959, Ser. No. 846,129, now Patent No. 3,074,765, dated Jan. 22, 1963. Divided and this application Dec. 6, 1962, Ser. No. 242,760
9 Claims. (Cl. 308—2)

This invention relates to knife-edge bearings, and relates more particularly to knife-edge bearings employed in weighing scales. This application is a division of application Serial No. 846,129, filed October 13, 1959 now Patent No. 3,074,765.

In many weighing mechanisms, levers are supported and the forces are transmitted to and from the levers by means of knife-edge pivot and bearing assemblies in which the knife-edge pivot rests in a suitably mounted bearing provided with a V-groove. The V-groove normally positions the pivot in a longitudinal plane and anti-friction plates applied to the end of the bearing block normally restrain the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife-edge pivot, the knife-edge pivot "skates" over the surface of the flattened bottom of the V-groove causing the lever to assume readily a different balance or zero position for every different position of the knife-edge pivot on the radius portion of the V-groove. The movement of the pivot relative to the radius portion of the V-groove alters in effect to the pivot distances, resulting in inaccuracies in the weighing.

In U.S. Patents Nos. 2,611,659, 2,611,660 and 2,611,661 there are disclosed several expedients for overcoming the disadvantages of V-grooved bearings. Thus, these patents show the use of a flat bearing for supporting a knife-edge pivot and restraining means for maintaining the knife-edge pivot in predetermined position and "skating" is prevented. The bearing, the knife-edge pivot and restraining members form a unitary assembly. While the several assemblies shown in the patents were satisfactory in use, they were relatively expensive to make since the restraining members were required, in the interest of accurate weighing, to be substantially identical in performance, i.e., the compressive forces on the restraining member had to be precisely equalized by the extension forces on the other restraining member. The expenditure of much time and effort was necessary to zero out the two restraining members to function properly.

It is an important object of this invention to provide a bearing for a weighing scale knife-edge pivot which will be free from the above-mentioned and other disadvantages and which will be especially simple in construction, inexpensive to produce, and efficient in use.

Another object of this invention is the provision of a novel knife-edge bearing member construction wherein a plurality of bearing members cooperate to support the knife-edge pivot and to restrain the same against lateral movement.

Still another object of this invention is the provision of a bearing construction and mounting therefor in which the knife-edge pivot is fully supported by the self-aligning bearing.

A further object of this invention is the provision of novel means for mounting the individual bearing members.

Other objects of this invention, together with certain details of construction and combinations of parts, will be apparent from the following description and will be pointed out in the appended claims.

In the drawings wherein preferred embodiments of my invention are shown:

Like reference numerals indicate like parts throughout the several views of the drawing.

Figure 1:
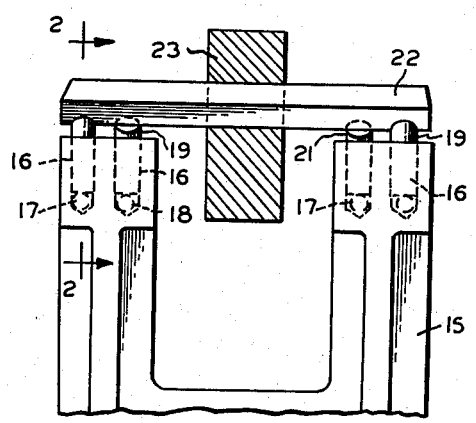
FIGURE 1 is a detail view showing the bearing elements of my invention mounted in a fulcrum stand and a knife-edge pivot supported on said bearing elements.
Figure 2:
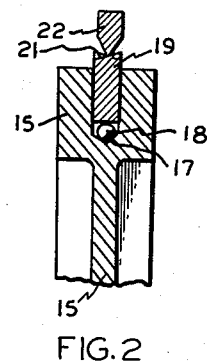
FIGURE 2 is a cross-sectional view taken on line 2—2 in FIGURE 1.

Referring now to the drawings for a detailed description of my invention, and particularly to FIGURES 1 and 2, the reference numeral 15 indicates a fulcrum stand provided with bores 16, the axes of which are vertical and the bottoms of which have conical holes or bores 17. Each of the holes or bores 17 is adapted to receive a ball 18 and a cylindrical bearing element 19 is received in each of the bores 16 and seated on ball 18, whereby the bearing elements are free to turn independently of each other with very little friction.

The upper ends of the metallic bearing elements 19 are formed with inclined bearing surfaces 21 which are substantially of the same inclination. These inclined surfaces may be formed by setting the bearing elements in a jig and ground true together in a single operation. As shown in FIGURES 1 and 2, the bearing elements are preferably mounted in the fulcrum stand in pairs and arranged so that the bearing surfaces are oppositely inclined to the horizontal axis. Two such pairs support a knife-edge pivot 22 of a lever 23 in such a manner that the bearing surface and the knife-edge pivot are always in proper alignment since the bearing elements are free to move into position where the knife-edge pivot is ideally supported. Thus, the instant arrangement of bearings and mountings therefor is self-aligning.

Figure 3:
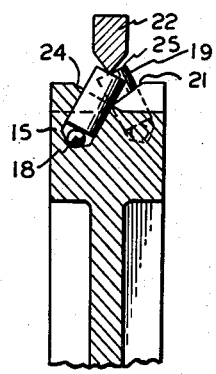
FIGURES 3 to 5 are modified forms of bearing elements and means for supporting said bearing elements on fulcrum stands.

FIGURE 3 shows a modified form of fulcrum stand and bearing element wherein the upper surface of the fulcrum stand 15 is provided with an inclined surface 24 and the the bore is formed with its axis normal to the plane of the inclined surface. In this modification, it is not necessary to machine the upper surfaces 25 of the cylindrical bearing elements as the plane bearing surfaces in their arrangement present inclined faces to the knife-edge pivot.

Figure 4:
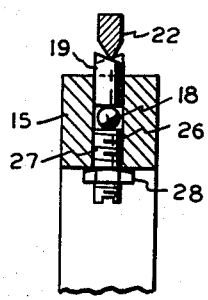
Figure 5:
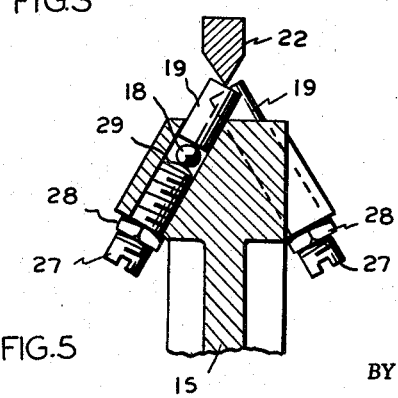

Means may be provided to adjust the position of each bearing element 19 relative to the fulcrum stand 15. To this end, as shown in FIGURE 4, the bore 16 is extended through the fulcrum stand and threaded at 26, and an adjusting set screw 27 is received in this extended bore. A lock nut 28 holds the set screw in adjusted position. In FIGURE 5 the set screw 27 is shown as provided with a conical tip 29 whereby friction is somewhat further reduced.

The embodiment of my invention shown and described herein is to be considered merely as illustrative, as my invention is susceptible to variation, modification and change within the spirit and scope of the appended claims.

What is hereby claimed and desired to be secured by Letters Patent is:

1. A knife-edge bearing for weighing scales comprising a non-flexible support having a plurality of spaced bores therein, a single substantially cylindrically-shaped non-flexible member in each of said bores, the upper extremity of each member having an inclined face thereon, said faces cooperating with each other to form a full V-bearing for the knife-edge.

2. A knife-edge bearing for weighing scales comprising a non-flexible support having a plurality of spaced bores therein, the axes of said bores being inclined toward each other, a single substantially cylindrical non-flexible member in each of said bores, the construction and arrangement of said members being such that the upper faces of said cylindrical members cooperate with each other to form a full V-bearing for the knife-edge.

3. A knife-edge bearing for weighing scales comprising a support having a plurality of pairs of spaced bores therein, the axes of each pair of said bores being inclined toward each other, a single substantially cylindrical non-flexible member in each of said bores, the construction and arrangement of said members being such that the upper faces of said cylindrical members cooperate with each other to form a full V-bearing for the knife-edge.

4. A knife-edge bearing for weighing scales comprising a support having a plurality of spaced bores therein, the axes of said bores being inclined toward each other, an anti-friction element in each bore, a substantially cylindrical member in each of said bores supported by the anti-friction element, the construction and arrangement of said members being such that the upper face of said cylindrical members cooperate with each other to form a full V-bearing for the knife-edge.

5. A knife-edge bearing for weighing scales comprising a support having a plurality of spaced bores therein, the axes of said bores being inclined toward each other, a ball-bearing in each bore, a substantially cylindrical member in each of said bores supported by the ball-bearing, the construction and arrangement of said members being such that the upper faces of said cylindrical members cooperate with each other to form a full V-bearing for the knife-edge.

6. A knife-edge bearing for weighing scales comprising a support having a plurality of spaced bores therein, a substantially cylindrically-shaped member in each of said bores, the upper extremity of each member having an inclined face thereon, said faces cooperating with each other to form a full V-bearing for the knife-edge, and means in said bores for adjusting the position of said members relative to said support.

7. A knife-edge bearing for weighing scales comprising a support having a plurality of spaced bores therein, a substantially cylindrically-shaped member in each of said bores, the upper extremity of each member having an inclined face thereon, said faces cooperating with each other to form a full V-bearing for the knife-edge, and set screw and lock nut means in said bores for adjusting the position of said members relative to said support.

8. A knife-edge bearing for weighing scales comprising a support having a plurality of pairs of spaced bores therein, the longitudinal axes of each pair of bores being inclined towards each other, a substantially cylindrically-shaped member in each of said bores, the upper extremity of each member having an inclined face thereon, said faces cooperating with each other to form a full V-bearing for the knife-edge, and means in said bores for adjusting the position of said members relative to said support.

9. A knife-edge bearing for weighing scales comprising a support having a plurality of spaced bores therein, the longitudinal axes of said bores being inclined toward each other, an anti-friction element in each bore, a substantially cylindrical member in each of said bores supported by the anti-friction element, the construction and arrangement of said members being such that the upper faces of said cylindrical members cooperate with each other to form a full V-bearing for the knife-edge, and set screw and lock nut means in said bores for adjusting the position of said members relative to said support.

References Cited by the Examiner

UNITED STATES PATENTS

| | | | |
|---|---|---|---|
| 1,734,129 | 11/29 | Henderson | 308—2 |
| 1,981,105 | 11/34 | Hieber | 308—2 |
| 2,849,260 | 8/58 | Rikken | 308—2 |

FRANK SUSKO, *Primary Examiner.*

ROBERT C. RIORDON, *Examiner.*